United States Patent [19]

Smith

[11] Patent Number: 5,642,355
[45] Date of Patent: Jun. 24, 1997

[54] METHOD OF SUPPORTING EXTENDED RANGE IN A TDMA SYSTEM

[75] Inventor: David Anthony Smith, Guildford, United Kingdom

[73] Assignee: Telefonaktiebolaget LM Ericsson, Stockholm, Sweden

[21] Appl. No.: 536,052

[22] Filed: Sep. 29, 1995

[51] Int. Cl.$^6$ .............................. H04J 3/16; H04B 7/212
[52] U.S. Cl. ..................... 370/337; 379/59; 455/33.1; 370/442; 370/459
[58] Field of Search .................. 370/85.7, 95.1, 370/95.3; 379/59; 455/33.1; 340/325.03

[56] References Cited

U.S. PATENT DOCUMENTS 5,483,537  1/1996  Dupuy ............................... 370/95.3

FOREIGN PATENT DOCUMENTS

| 295 227 | 12/1988 | European Pat. Off. | ......... H04Q 7/02 |
| 511 861 | 11/1992 | European Pat. Off. | ......... H04B 7/26 |
| 589 753 | 3/1994 | European Pat. Off. | ......... H04Q 7/04 |
| 614 290 | 9/1994 | European Pat. Off. | ......... H04B 7/26 |
| WO95/02306 | 1/1995 | WIPO | ......... H04Q 7/30 |

*Primary Examiner*—Douglas W. Olms
*Assistant Examiner*—Matthew C. Phillips
*Attorney, Agent, or Firm*—Burns, Doane, Swecker & Mathis, L.L.P.

[57] ABSTRACT

A method for allocating timeslots to mobile stations in a cell in a cellular communication system is disclosed. First, the distance each mobile station is from a base station in the cell is determined. Then each mobile station is assigned a timeslot based upon the distance each mobile station is from the base station, wherein the timeslots within a contiguous group of timeslots are assigned to the mobile stations in the order of the mobile stations increasing distance from the base station and at least one timeslot at the back of the contiguous group is not assigned so as to allow bursts from the mobile stations to slide into the next timeslot.

20 Claims, 3 Drawing Sheets

Fig. 1
(PRIOR ART)
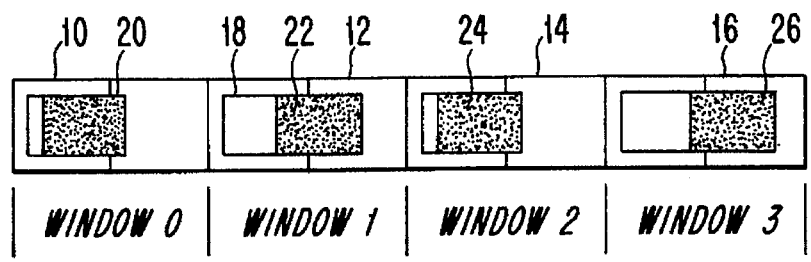
| WINDOW 0 | WINDOW 1 | WINDOW 2 | WINDOW 3 |
Fig. 2
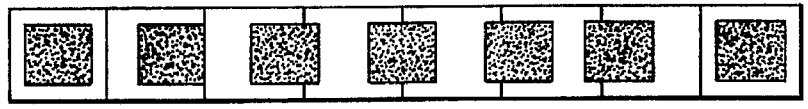
Fig. 5
| TS1 | TS2 | TS3 | TS4 | TS5 | TS6 | TS7 | TS8 |
|---|---|---|---|---|---|---|---|
| RD=5<br>VD=5 | RD=10<br>VD=15 | RD=25<br>VD=20 | RD=15<br>VD=25 | RD=40<br>VD=50 | IDLE | RD=60<br>VD=70 | IDLE | ated by the shaded boxes. By
METHOD OF SUPPORTING EXTENDED RANGE IN A TDMA SYSTEM

FIELD OF THE INVENTION

The present invention relates to a method for allocating time slots to mobile stations in a cellular communication system so as to extend the range of a time division multiple access (TDMA) cellular communication system.

BACKGROUND OF THE DISCLOSURE

Presently, much attention and developmental effort is being focused on digital mobile radio telephone systems. The mobile stations and the respective base stations of a TDMA system communicate across time division multiple access channels whereby multiple mobile stations share the same transmission and reception frequencies, but are assigned separate timeslots within those frequencies. In normal operation, the mobile stations transmit bursts at certain times allowing for propagation delays so that the bursts are received at a base station in their assigned timeslots. Otherwise, transmissions from different mobile stations collide or overlap, resulting in mutual interference in reception at the base station. Typically, a guard band is inserted between the timeslots to help prevent the bursts from overlapping. However, the guard bands are generally only a few symbols wide and as a result only guard against small time alignment errors.

In the Global System for Mobile Communications (GSM), the mobile station is effectively synchronized to the downlink from the base station and therefore the "local" time at the mobile station is effectively always somewhat slow compared to the base station because of the time taken by the propagation of the downlink signal. Uplink bursts are further delayed because of the finite speed of light. Therefore, uplink signals from mobile stations at different distances will arrive with varying degrees of lateness unless compensating measures are taken.

In GSM, the base station is able to measure of degree of "lateness" of a received uplink burst, and using a parameter known as timing advance value, is able to instruct the mobile to transmit its burst earlier, such that allowing for the propagation delay for the uplink signal, the burst is received at the base station at exactly the right time. In other words, the burst is actually transmitted by the mobile station in advance of its nominal timing.

Mobile stations at different distances to the base station therefore transmit their uplink bursts at different times based on different timing offsets, but the end result is that each burst is received in its nominal timeslot, and thus the bursts do not interfere with each other. The timing advance parameter is periodically resent to the mobile station, and therefore changes in the propagation delays due to the movement of the mobile station can be compensated for before problems arise.

However, in most cellular systems, the timing advance has a maximum value which corresponds to a maximum cell radius. For example, in GSM, the timing advance is a 6 bit variable value ranging from 0 to 63. The limited range of the timing advance value effectively restricts the maximum size of the cell. When the timing advance has a value of 63, the cell radius is approximately 35 kilometers in GSM. If the mobile station exceeds this radius, the burst can not be advanced any further and as a result, the burst received at the base station will start to slide back into the next timeslot corrupting both bursts.

One method for extending the range of a cell in a TDMA system is to assign a mobile station two consecutive timeslots rather than one timeslot as illustrated in FIG. 1. In FIG. 1, an 8-timeslot frame has been divided into 4 groups 10, 12, 14, and 16 which each contain two consecutive timeslots. In FIG. 1, the "white" inner box 18 illustrates the nominal position of a burst, which has slid backward while its actual arrival time is illustrated by the shaded boxes. By assigning each mobile station two consecutive timeslots and assigning the nominal position of the burst to the first of the two timeslots, a mobile station can travel past the original cell radius since the burst can slide back into the second timeslot without interfering with the burst of another mobile station. As the distance between the mobile station and the base station increases, the burst will slide back further and further into the second timeslot. A new limit is reached when the burst slides back an entire timeslot. In the GSM system, this new limit corresponds to approximately 100 km. If the mobile station goes any further from the base station, the burst will then start to slide into the next, i.e., third, timeslot which may corrupt a burst in the following timeslot.

The disadvantage in using this prior art solution to extend the range of each cell in a system is that the capacity of the system is effectively halved since each mobile station is assigned two timeslots rather than one. Thus, there is a need in the art for a method of extending the range of a TDMA system without drastically reducing the capacity of the TDMA system.

In prior systems, a mobile station is assigned to an available timeslot regardless of the propagation delay of the mobile station. This is illustrated in FIG. 1, where the burst in window 2 is seen to have slid less than the burst in window 1.

SUMMARY OF THE INVENTION

It is an object of the present invention to provide a method for extending the range of a TDMA system without drastically compromising the capacity of the cellular system. This object is accomplished by overcoming the need for an idle timeslot for each specific burst to slide back into, by allocating timeslots to mobile stations at least partly based on the distance each mobile station is from a base station. One of the novel principles of this method is that since the mobiles are rigorously ordered in increasing distance order, either physical or virtual distance. In the present invention, the uplink burst from the most distant mobile station, at extreme range will slide backwards into the idle timeslot or timeslots at the back of the extended range group. This will in turn vacate the front of that burst's nominal timeslot, allowing the preceding burst from a closer mobile station to slide back. Since the timeslots are allocated according to the distance between the mobile and base station, the mobile station using the preceding timeslot is known to be closer, and thus its burst will not slide back so far, and thus cannot overlap with the burst from the most distant mobile station. This principle repeats back through all timeslots until the mobile closest to the BTS is reached.

According to one embodiment of the present invention, a method for allocating timeslots to mobile stations in a cell in a cellular communication system is disclosed. First, the distance from each of a plurality of mobile stations to the base station is determined. Normal timeslots may exist in isolation and be assigned as today, however a group of three or more contiguous timeslots may be utilized as an extended range group. This group may begin with any timeslot allowing for the fact that timeslots 7 and 0 are contiguous in a TDMA system with 8 timeslots per frame, such as GSM.

Mobile stations are allocated timeslots within the extended range group according to the order of their distance from the base station, the closest mobile station being at the front of the extended range group of timeslots and the unused timeslots are idle, that are not filled, and no carrier is transmitted. The group always contains at least one contiguous idle timeslot at the rear of the group to allow bursts to slide backward into that space, however there may be other idle timeslots within the group.

In this embodiment, the timing advance does not need to be used for timeslots within the group, however, timing advance can be used if it is applied to all of the mobile stations within the group. If a timing advance is applied, all of the mobile stations within the normal maximum radius will have their bursts arrive in the nominal position and will only start to slide backwards when the normal range limit is exceeded. The degree of extended range which can be supported by allowing the burst to slide backwards up to one or more entire timeslots is therefore added to the existing 35 km range limit. Where timing advance is not used, all uplink bursts will slide back to some extent, even from mobile stations quite close to the base station. Thus, the maximum cell radius is given only by the distance over which propagation delays cause the uplink burst to slide back one or more entire timeslots, to the back of the idle timeslots at the trailing end of the extended range group. Applying timing advance in addition to the support for sliding bursts effectively absorbs up to the first 35 km of propagation delay, as normal. Thus, the new maximum cell radius is 35 km greater.

According to another embodiment of the present invention, timing advance values can be used in a novel way in the timeslot allocation method. First, the system determines the distance each mobile station is from a base station in the cell. The system now introduces an offset to the timing with which the mobile station transmits its bursts by instructing the mobile station to apply a certain timing advance value. Due to the finite speed of light, it will be realized by one skilled in the art that any change in timing is equivalent to a change in distance. For example, a burst transmitted slightly later and therefore received slightly later is indistinguishable from a burst transmitted on time from slightly further away. Conversely a burst transmitted slightly earlier will appear to come from slightly closer. In this disclosure, the effect of such a physical distance plus some timing offset shall be called a virtual distance. Then, the system assigns each mobile station a timeslot based upon the virtual distance each mobile station is from the base station, wherein the timeslots within a contiguous group of timeslots are assigned to the mobile stations in the order of the mobile stations increasing virtual distance from the base station and one or more timeslots at the back of the extended range group are reserved so as to allow a burst from the mobile stations to slide into the next timeslot. The advantage of using virtual distances rather than physical distances in this manner is that for any given set of physical distances (which cannot be controlled), it is possible to compute a set of timing offsets which will give any desired ordering of the mobile stations by virtual distance. Thus changes in the relative distances between the mobile stations and the BTS can be absorbed without having to reallocate the timeslots.

BRIEF DESCRIPTION OF THE DRAWINGS

The present invention will now be described in more detail with reference to preferred embodiments of the invention, given only by way of example, and illustrated in the accompanying drawings, in which:

FIG. 1 illustrates four extended range timeslots according to a known method;

FIG. 2 illustrates an eight-timeslot frame which supports seven transmission bursts according to one embodiment of the present invention.

FIG. 5 illustrates an eight-timeslot group according to one embodiment of the present invention.

DETAILED DESCRIPTION OF THE PREFERRED EMBODIMENT

Figure 3:
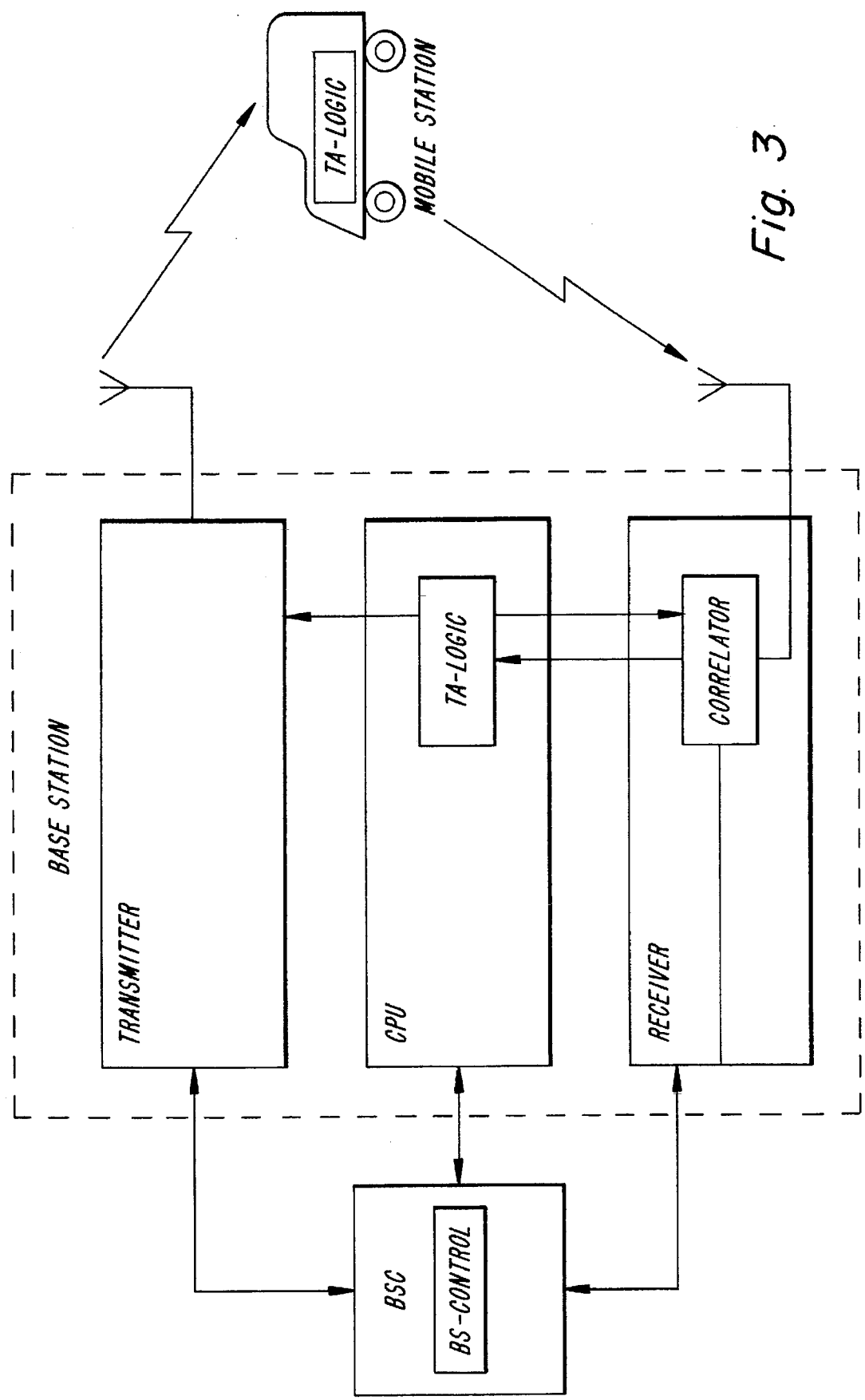
FIG. 3 is a block diagram of a communications synchronization portion of a base station in a mobile station in a mobile radio telephone system.

The present invention will now be described with some references to the GSM system. It will be appreciated by one skilled in the art that the present invention also applies to other TDMA systems as well. For simplicity, elements not essential to the understanding of the present invention have been omitted.

According to one embodiment of the present invention, the range of the cellular system can be extended without causing uplink bursts to overlap and hence interfere by allocating timeslots to mobile stations based upon the physical distance the mobile station is from a base station and by not assigning at least one timeslot in a group of contiguous timeslots, which may or may not be the entire TDMA frame. By arranging the timeslots so that they are allocated to mobile stations in the order of their increasing distance from the base station, the transmission bursts contained in the timeslots will be delayed by an increasing amount due to the propagation delays. In other words, the mobile stations are assigned timeslots in such an order so that the burst of a mobile station in a next timeslot is delayed by at least as much as the burst in the present timeslot. In order to extend the range of the system, at least one timeslot, i.e., the last timeslot or timeslots in the contiguous group are not assigned to a mobile station, thus allowing the other timeslots in the frame or group to slide back a total of one or more timeslots. In the GSM system, this would extend the range of a cell substantially in excess of the normal limiting cell radius.

FIG. 2 illustrates a frame containing eight timeslots which can support up to seven transmission bursts, wherein at least the last timeslot is not assigned to a mobile station so as to allow the seven transmission bursts to slide back up to an entire timeslot. By way of example, the time at which the seven bursts might arrive from mobile stations at different distances is shown as a shaded box. Note that the seventh burst has slid so far as to be wholly within the eighth timeslot, which is arranged to be nominally idle. It will be appreciated that the present invention applies to other systems in which the number of timeslots per frame is greater or less than eight. Furthermore, the group does not have to be the same size as the frame or start at the beginning of the frame. As a result, it doesn't matter that a burst from a mobile station n is received in the timeslot that would normally be used from a mobile station n+1 since the burst of the mobile station n+1 will be delayed by at least as much as the burst from the mobile station n.

In prior systems, the capacity of the system was reduced by 50% in order to extend the range of a cell. However, the present invention substantially increases the range of a cell while potentially only sacrificing one timeslot per frame, i.e., a 12.5% reduction in capacity if there are eight timeslots per frame. Thus, the range of the cellular system is increased without drastically reducing the capacity of the system.

This embodiment can be further modified by using timing advance values as long as the traditional usage of timing advance is applied to all of the mobile stations within the group. If a timing advance is applied, all of the mobile stations within the effective radius will have their bursts arrive in the nominal position and this maximizes the effective radius limit which can be sustained for any given number of idle timeslots at the rear of the group. This also allows the front boundary of the group to be adaptively allocated.

According to another embodiment of the present invention, timing advance values can be used in a novel way in the timeslot allocation process. The base station includes a transmitter portion, a receiver portion, and a control portion, the latter being implemented by a CPU, as illustrated in FIG. 3. The control portion of the base station implements the timing advance control (TA-LOGIC) in TDMA systems constructed according to the GSM model. A base station control function (BS-control) is also implemented in a CPU. The receiver includes, among other elements, a correlator. The correlator produces an output signal to both BS-control and TA-logic. The correlator maintains a reference time base and times the occurrence of an incoming signal in relation to the timeslot window. The results of the measurements are sent to the CPU. The CPU in turn provides new parameters for the channel allocation and timing advance. According to the GSM model, timeslot (channel) allocation is preformed within the base station controller, and TA-logic is performed within the base station, but other implementations of TDMA systems may place these functions differently.

In prior systems, the timing advance values are used by mobile stations to adjust the transmissions of their bursts so that each is received in its assigned timeslot. In addition to this, the present invention uses the timing advance values as an offset to modify the time of arrival of bursts from a mobile station at a given distance by up to the limits of the timing advance value range. In other words, the timing advance value can be used to change the distance that a mobile station appears to be from the base station. Therefore, the timing advance can be seen to be equivalent to a distance offset which is added to the physical distance between the mobile station and the base station to give a virtual distance.

It will be appreciated by one skilled in the art that the traditional application of timing advance is to maintain a virtual distance of zero, that is apply a timing offset specifically computed to compensate for the propagation delays between the base station and a mobile station, such that the uplink bursts are always received without any delay. The novelty of this particular embodiment of the present invention is to use different values of timing advance to generate variable, and specifically non-zero virtual distances.

In a general sense, a base station operates on a set of radio channels and communicates with a plurality of mobile stations. The base station is controlled by the base station controller which controls such functions as handover and channel allocation.

In the present embodiment, the virtual distance to the mobile station rather than the real distance is used when assigning a timeslot to the mobile station. It will be appreciated that the ability to generate any virtual distance for a mobile station with a given instantaneous real distance by adjusting the timing advance values gives considerable flexibility in allocating timeslots when calls are setup. It will be realized by one skilled in the art that the purpose of extended range is to allow mobiles to operate over a distance range greater than the 0.35 km supported by the available range of timing advance values. Thus, the flexibility to allocate timeslots is less than complete, however it is sufficient to substantially reduce the need for internal handover to reallocate timeslots as mobile stations move relative to each other, as the physical movement can be compensated for by varying the offset, the timing advance values, so that the virtual distances remain rigorously ordered by increasing distance. One skilled in the art will appreciate that the vast majority of calls over a cellular telephony system are rather short, during which time the mobile station typically moves far less than 35 km.

Figure 4:
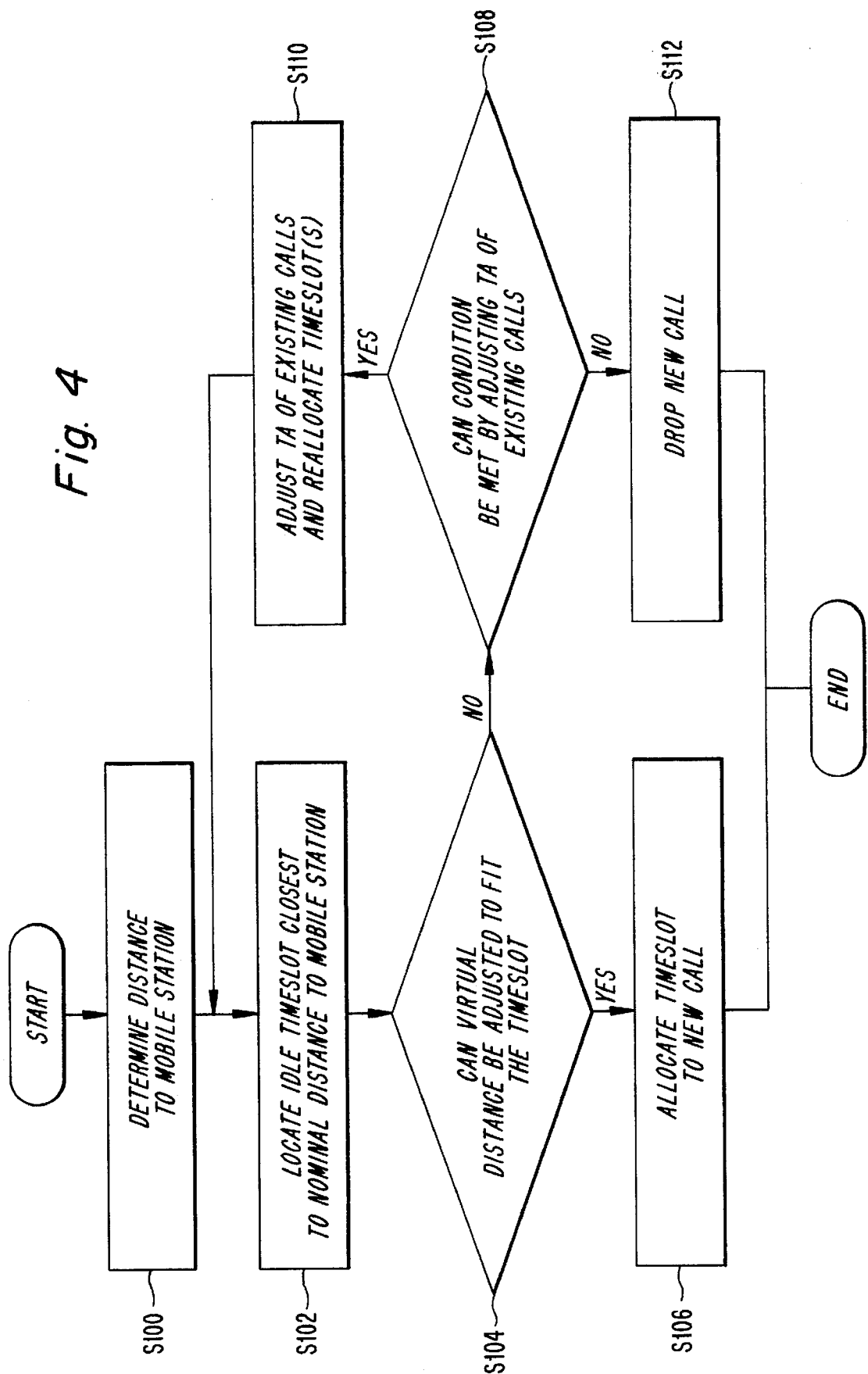
FIG. 4 is a flow chart representation of a call allocating process according to one embodiment of the present invention.

This embodiment of the present invention will further be described with reference to FIG. 4 which illustrates one possible call allocation process. When a call is requested, the distance to the mobile station from the base station is determined using one of a plurality of known methods in step S100. The system then looks at the available timeslots to determine which idle timeslot corresponds the closest to the distance the mobile station is from the base station in step S102. In other words, if the mobile station is close to the base station an idle timeslot near the front of the frame should be selected and if the mobile station is far from the base station an idle timeslot near the end of the frame should be selected. Once a timeslot is selected, the network determines, in step S104, whether the timing advance for signals from the mobile stations can be adjusted within the timing advance limit range so that the signal is received at an appropriate time so that the burst is received without overlapping either the preceding or trailing burst, should such exist. If the timing advance can be properly adjusted, the new call is allocated the selected timeslot in step S106. Thus, the virtual distance rather than the real distance is used in the timeslot allocation process.

If in step S104 it is determined that the available idle timeslots are not within a predetermined distance (35 km in GSM), the system determines whether the timing advance of existing calls can be adjusted to free a timeslot in the proper range for the new call in step S108. If the existing calls can not be adjusted in such a manner to open up an appropriate timeslot for the new call the call is dropped in step S112. However, if the timing advance values for the existing calls can be changed to open a timeslot for the new call, the timing advance values for at least one of the existing calls are adjusted and the new call is allocated a timeslot in step S110.

For example, take the situation illustrated in FIG. 5 wherein 6 existing calls are using timeslots 1–5 and 7 and RD represents the real distance the mobile station is from the base station and VD represents the virtual distance the mobile station is from the base station. Notice that the mobile stations assigned to timeslots 3 and 4 are not in the proper order according to their real distance, but the timing advance values have been used so that their virtual distances are in the proper order. Now if a new mobile station wants to make a call, the system first determines the real distance to the mobile station, in this example RD=10 km. Thus, the maximum virtual distance which can be created is equal to 10 km+35 km=45 km. In this example, only timeslot available is timeslot 6. However, the mobile station using timeslot 5 has a real distance of 40 km and a virtual distance of 50 km. Thus, timeslot 6 can not immediately be assigned to the new mobile station (MS1) since the maximum virtual distance of the new mobile station is less than the virtual distance of the mobile station (MS2) using timeslot 5. At this point, the system has several options. First, the virtual distance of the mobile station MS2 could be adjusted by changing the timing advance value of MS2 so that the virtual distance of MS2 is less than 45 km, for example 35 km. As a result, the mobile station MS1 can now be assigned to timeslot 6 by setting the timing advance values so that the virtual distance is equal to 40 km. In addition, the system could have reallocated new timeslots to the mobile stations using timeslot 3–5 and allocated timeslot 3 to the new mobile station.

After allocation of the timeslots, the system continuously monitors the movements of the mobile stations and adjusts their timing advance values accordingly so that the burst arrival time of signals from the mobile stations are in their correct order based upon each mobile stations virtual distance so as to avoid mutual interference. Furthermore, the system also can manipulate the timing advance values in such a way that existing idle timeslots can be used to support any new call that might arise regardless of its distance from the base station without having to perform an emergency reallocation. However, if a timing advance value begins to approach their range limit, i.e., 0 and 63 in GSM, the system may reallocate at least one of the timeslots and adjusts the timing advance values of the mobile stations so that the timing advance value is no longer near the range limit.

According to another embodiment of the present invention, the last two timeslots rather than the last timeslot can be nonassigned so that the remaining six timeslots can slide up to two full timeslots in order to increase the range of the system even further. It will be appreciated by one skilled in the art that any number of consecutive timeslots at the end of a frame or a contiguous group of timeslots can be non-assigned so as to allow the remaining assigned timeslots to slide back varying distances.

According to another embodiment of the present invention, timeslots other than those at the end of the contiguous group which are deliberately kept idle to allow bursts to slide, may also be idle. One skilled in the art will appreciate that such an idle timeslot can be treated as though an "imaginary mobile" were present, with a suitable virtual distance to avoid interfering with the leading or trailing burst, and that its burst has zero amplitude (and is of zero interest): the only matter of importance is that real bursts never overlap and thus mutually interfere. The practical significance of this is that there is no necessity to constantly reallocate timeslots whenever calls terminate in order to "close up the gaps" in the contiguous sequence of timeslots.

While a particular embodiment of the present invention has been described and illustrated, it should be understood that the invention is not limited thereto since modifications may be made by persons skilled in the art. The present application contemplates any and all modifications that fall within the spirit and scope of the underlying invention disclosed and claimed herein.

What is claimed is:

1. A method for allocating timeslots to mobile stations in a cell in a cellular communication system, comprising the steps of:

determining the distance each mobile station is from a base station in the cell;

offsetting the timing of the uplink burst transmission by an amount equivalent to a given distance offset according to the finite speed of light by up to a predetermined amount to form a virtual distance for each mobile station;

assigning each mobile station a timeslot based upon the virtual distance each mobile station is from the base station, wherein the timeslots within a contiguous group of timeslots are assigned to the mobile stations in the order of the mobile stations increasing virtual distance from the base station and at least one timeslot within said contiguous group is not assigned so as to allow a burst from the mobile stations to slide into the next timeslot.

2. A method according to claim 1, wherein said contiguous group contains eight timeslots.

3. A method according to claim 1, wherein up to n-1 bursts may be supported per frequency in a TDMA system with n timeslots per frame.

4. A method according to claim 1, wherein at least the last timeslot is not assigned so as to allow bursts in the remaining timeslots to slide back by up to at least one timeslot.

5. A method according to claim 1, wherein the distance is offset using timing advance values for each mobile station.

6. A method according to claim 5, wherein time of arrival of a burst is modified by the timing advance value.

7. A method according to claim 5, wherein said timing advance values can change the virtual distance by up to the distance of the range of timing advance values available in a TDMA system.

8. A method according to claim 7, further comprising the step of:

reassigning a timeslot to a mobile station when the timing advance value for the mobile station approaches a limit.

9. A method according to claim 5, further comprising the step of:

periodically adjusting the timing advance values for each mobile station in order to compensate for any movement by the mobile stations so that the virtual distance for each mobile station remains unchanged.

10. A method according to claim 1, wherein one or more timeslots may be idle within the group of contiguous timeslots, where one or more timeslots between the idle timeslots and the unassigned timeslot at the back of the group is busy.

11. An allocation system for allocating timeslots to mobile stations in a cell in a cellular communication system, comprising:

means for determining the distance each mobile station is from a base station in the cell;

means for offsetting the timing of the uplink burst transmission by an amount equivalent to a given distance offset according to the finite speed of light by up to a predetermined amount to form a virtual distance for each mobile station; and means for assigning each mobile station a timeslot based upon the virtual distance each mobile station is from the base station, wherein the timeslots within a contiguous group of timeslots are assigned to the mobile stations in the order of the mobile stations increasing virtual distance from the base station and at least one timeslot within said contiguous group is not assigned so as to allow a burst from the mobile stations to slide into the next timeslot.

12. An allocation system according to claim 11, wherein said contiguous group contains eight timeslots.

13. An allocation system according to claim 11, wherein up to n-1 bursts may be supported per frequency in a TDMA system with n timeslots per frame.

14. An allocation system according to claim 11, wherein at least the last timeslot is not assigned so as to allow bursts in the remaining timeslots to slide back by up to at least one timeslot.

15. An allocation system according to claim 11, wherein the distance is offset using timing advance values for each mobile station.

16. An allocation system according to claim 15, wherein time of arrival of a burst is modified by the timing advance value.

17. An allocation system according to claim 15, wherein said timing advance values can change the virtual distance by up to the distance of the range of timing advance values available in a TDMA system.

18. A method according to claim 17, further comprising:
means for reassigning a timeslot to a mobile station when the timing advance value for the mobile station approaches a limit.

19. A method according to claim 15, further comprising:

means for periodically adjusting the timing advance values for each mobile station in order to compensate for any movement by the mobile stations so that the virtual distance for each mobile station remains unchanged.

20. A method according to claim 11, wherein one or more timeslots may be idle within the group of contiguous timeslots, where one or more timeslots between the idle timeslots and the unassigned timeslot at the back of the group is busy.

* * * * *